United States Patent
Gonzalez De Langarica

(10) Patent No.: US 12,010,270 B2
(45) Date of Patent: Jun. 11, 2024

(54) CALL QUEUE MANAGEMENT BY DIGITAL ASSISTANT

(71) Applicant: Telefonaktiebolaget LM Ericsson (publ), Stockholm (SE)

(72) Inventor: Ester Gonzalez De Langarica, Vitoria (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/769,059

(22) PCT Filed: Oct. 17, 2019

(86) PCT No.: PCT/SE2019/051021
§ 371 (c)(1),
(2) Date: Apr. 14, 2022

(87) PCT Pub. No.: WO2021/076024
PCT Pub. Date: Apr. 22, 2021

(65) Prior Publication Data
US 2024/0007564 A1    Jan. 4, 2024

(51) Int. Cl.
*H04M 3/523* (2006.01)
*H04M 3/493* (2006.01)

(52) U.S. Cl.
CPC ....... *H04M 3/5238* (2013.01); *H04M 3/4935* (2013.01)

(58) Field of Classification Search
None
See application file for complete search history.

(56) References Cited

U.S. PATENT DOCUMENTS

| 8,175,257 B1 | 5/2012 | Shaffer et al. |
| 9,888,117 B1 | 2/2018 | Ranganath et al. |

(Continued)

FOREIGN PATENT DOCUMENTS

WO    2017/186271 A1    11/2017

OTHER PUBLICATIONS

International Search Report and Written Opinion dated Sep. 18, 2020 in International Application No. PCT/SE2019/051021 (10 pages).

*Primary Examiner* — Harry S Hong
(74) *Attorney, Agent, or Firm* — Rothwell, Figg, Ernst & Manbeck, P.C.

(57) ABSTRACT

The present disclosure relates to a method of a digital assistant device (305) of managing a voice call established between a calling party (300) and a recipient (303), the voice call having been queued to await a response by a human representative (303a) of the recipient (303) of the voice call, and a digital assistant device (305) performing the method. In a first aspect, a method of a digital assistant device (305) of managing a voice call established between a calling party (300) and a recipient (303), the voice call having been queued to await a response by a human representative (303a) of the recipient (303) of the voice call, is provided. The method comprises detecting (S101), from a voice indication of the voice call, information indicating a point in time when the human representative (303a) of the recipient (303) is expected to be able to provide a response to the queued voice call, and setting (S102) the calling party (300) in contact with the recipient (303) at the determined point in time.

14 Claims, 3 Drawing Sheets

S201
Detecting, from a voice indication of the caller, information indicating a point in time when a human representative of a recipient is expected to be able to provide a response to a caller of the queued voice call S202
Setting the caller in contact with the recipient at the indicated point in time

(56) References Cited

U.S. PATENT DOCUMENTS

| | | | |
|---|---|---|---|
| 2009/0285385 A1* | 11/2009 | Dunbar | H04M 3/523 |
| | | | 379/266.01 |
| 2010/0303227 A1 | 12/2010 | Gupta | |
| 2016/0021247 A1* | 1/2016 | Marimuthu | H04M 1/72409 |
| | | | 455/414.1 |
| 2022/0046133 A1* | 2/2022 | Li | H04M 3/4286 |

* cited by examiner

CALL QUEUE MANAGEMENT BY DIGITAL ASSISTANT

CROSS REFERENCE TO RELATED APPLICATION(S)

This application is a 35 U.S.C. § 371 National Stage of International Patent Application No. PCT/SE2019/051021, filed Oct. 17, 2019.

TECHNICAL FIELD

The present disclosure relates to a method of a digital assistant device of managing a voice call established between a calling party and a recipient, the voice call having been queued to await a response by a human representative of the recipient of the voice call, and a digital assistant device performing the method.

BACKGROUND

The use of digital assistants has grown rapidly the last couple of years such as for instance Siri for iOS or Google Now for Android. With the entrance of smart speakers, digital assistants such as e.g. Alexa, Alice, Cortana, etc., have become even easier to access than the assistants operating on smart phones and tablets.

Users are utilizing the digital assistants for services such as general questions, weather forecasts, controlling streaming of audio and video, calendar events, etc.

Amazon and Google are currently leading the market with their Echo and Home product lines. The support given by Alexa and Google assistant is extensive and is ever increasing.

With digital assistants, call queue management can be improved.

SUMMARY

An object is to solve, or at least mitigate, the problem of call queue management in the art and thus to provide an improved method of a digital assistant device of managing a queued voice call having been established between a calling party and a recipient.

This object is attained in a first aspect of the invention by a method of a digital assistant device of managing a voice call established between a calling party and a recipient, the voice call having been queued to await a response by a human representative of the recipient of the voice call. The method comprises detecting, from a voice indication of the voice call, information indicating a point in time when the human representative of the recipient is expected to be able to provide a response to the queued voice call, and setting the calling party in contact with the recipient at the determined point in time.

This object is attained in a second aspect of the invention by a digital assistant device configured to manage a voice call established between a calling party and a recipient, the voice call having been queued to await a response by a human representative of the recipient of the voice call. The digital assistant device comprises a processing unit and a memory, said memory containing instructions executable by said processing unit, whereby the digital assistant device is operative to detect, from a voice indication of the voice call, information indicating a point in time when the human representative of the recipient is expected to be able to provide a response to the queued voice call, and to set the calling party in contact with the recipient (303) at the determined point in time.

Upon a caller placing a voice call with a recipient via e.g. a mobile phone, which voice call is directed to for instance a call centre at the recipient where a human representative is available for answering the voice call, a computer implementing a telephone exchange will activate an answering machine which replies to the caller via the mobile phone that the caller has been placed in a call queue ("we will answer your call within approximately 14 minutes").

To wait by the phone to listen to the answering machine repeatedly informing about time remaining in the queue is a tedious process.

To overcome this problem, a digital assistant device is implemented to detect, from a voice indication of the voice call, information indicating a point in time when the human representative of the recipient is expected to be able to provide a response to the queued voice call. Subsequently, the digital assistant device will set the caller having hung up the voice call in contact with the human representative at the indicated point in time.

Advantageously, the caller is not required to listen to the audio coming from the phone informing the caller about her place in the queue. Rather, the caller can end the call and proceed with whatever she wishes to do while waiting for the digital assistant device to set up the new call or resume the ongoing call.

In an embodiment, the setting of the calling party in contact with the recipient at the determined point in time comprises establishing a new voice call between the recipient and the calling party at the determined point in time.

In another embodiment, the setting of the calling party in contact with the recipient at the determined point in time comprises resuming the ongoing voice call between the recipient and the calling party at the determined point in time.

Hence, it may be envisaged that the caller is set in contact with the human representative either via the ongoing voice call, in which scenario the caller is notified by the digital assistant device via for instance Short Message Service (SMS), WhatsApp, e-mail, etc., at the indicated point in time that she is expected to pick up the call such that the human representative at the other end of the line can resume the call and thus provide the response, or that a new call is established between the caller and the human representative.

In an embodiment, the detection of information from a voice indication of the voice call comprises detecting the information from a voice indication provided by the calling party. Hence, an instruction from the caller is given to the digital assistant device, such as "Please call back when 1 minute of the queue remains", whereupon the caller hangs up the call and under control of the digital assistant device is called back when the caller indeed has 1 minute remaining in the queue, or is notified as described above that that she is expected to resume the ongoing voice call.

In another embodiment, the detection of information from a voice indication of the voice call comprises detecting the information from a voice indication provided by the recipient. Hence, the digital assistant device detects from the information given by the answering machine ("we will answer your call within approximately 14 minutes") when the human representative is capable of providing a response, whereupon the digital assistant device establishes a new call, or resumes the ongoing call, between the recipient and the caller such that the caller can talk to the human representative.

In an embodiment, when the digital assistant device is configured to either set up a new call or to resume the ongoing call, the digital assistant device is configured to remain connected with the recipient after having detected the information indicating a point in time when the human representative of the recipient is expected to be able to provide a response to the queued voice call, and to monitor a current position of the voice call in the queue on the basis of information provided by the recipient.

In a further embodiment, if the ongoing call is to be resumed, the digital assistant device notifies the caller that the ongoing voice call is to be resumed.

In still an embodiment, the digital assistant device provides the recipient with contact information of the calling party, wherein the recipient establishes a voice call with the calling party at the point in time when the human representative of the recipient is expected to be able to provide a response to the queued voice call.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
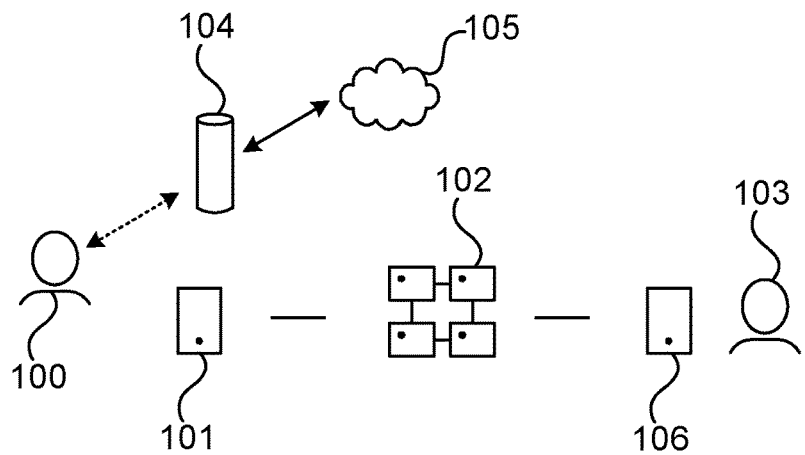
FIG. 1 illustrates a prior art over-the-top (OTT) network in which embodiments may be implemented.

FIG. 1 illustrates a prior art over-the-top (OTT) network, i.e. a network where a media service is delivered over the internet without having to pass over a media to which the user subscribes such as cable TV service or an IP Multimedia Subsystem (IMS).

In this example, a user 100 is involved in a phone call using her mobile phone 101 to communicate for instance over an IMS or Voice over Long-Term Evolution (VoLTE) system 102 with a recipient 103 via the recipient's mobile phone 106.

If the user 100 requests some service, for instance to set up a three-party call, she can voice her request to a smart speaker 104 (being able to detect what the user 100 is saying) which will forward the request to the OTT digital assistant 105, which will initiate the three-party call. It is noted that the OTT digital assistant 105 is capable of interacting with the VoLTE system 102 to include a third person in the ongoing call.

Figure 2:
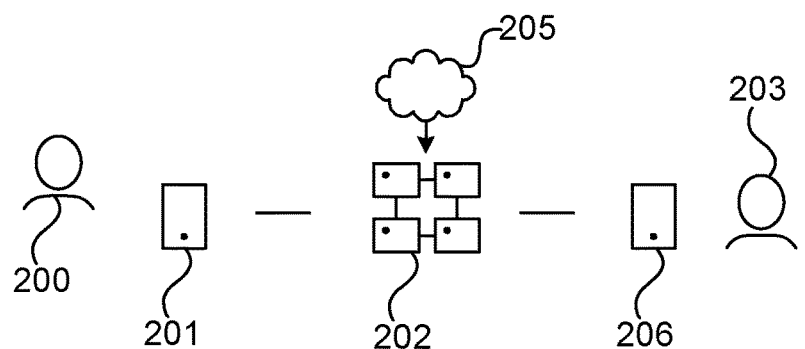
FIG. 2 illustrates a prior art operator-driven network in which embodiments may be implemented.

FIG. 2 illustrates a prior art operator-driven network. In this example, a user 200 is involved in a phone call using her mobile phone 201 to again communicate for instance over an IMS or VoLTE system 202 with a recipient 203 via the recipient's mobile phone 106.

If the user 200 request some service, for instance to set up a three-party call, she can voice her request to her mobile phone 201 which will forward the request to the operator-driven digital assistant 205, which will initiate the three-party call via the VoLTE system 202.

An advantage of the operator-driven network as compared to the OTT is that there is no need for an additional device (i.e. the smart speaker 104), and it would work from any legacy phone, fixed or mobile.

Figure 3:
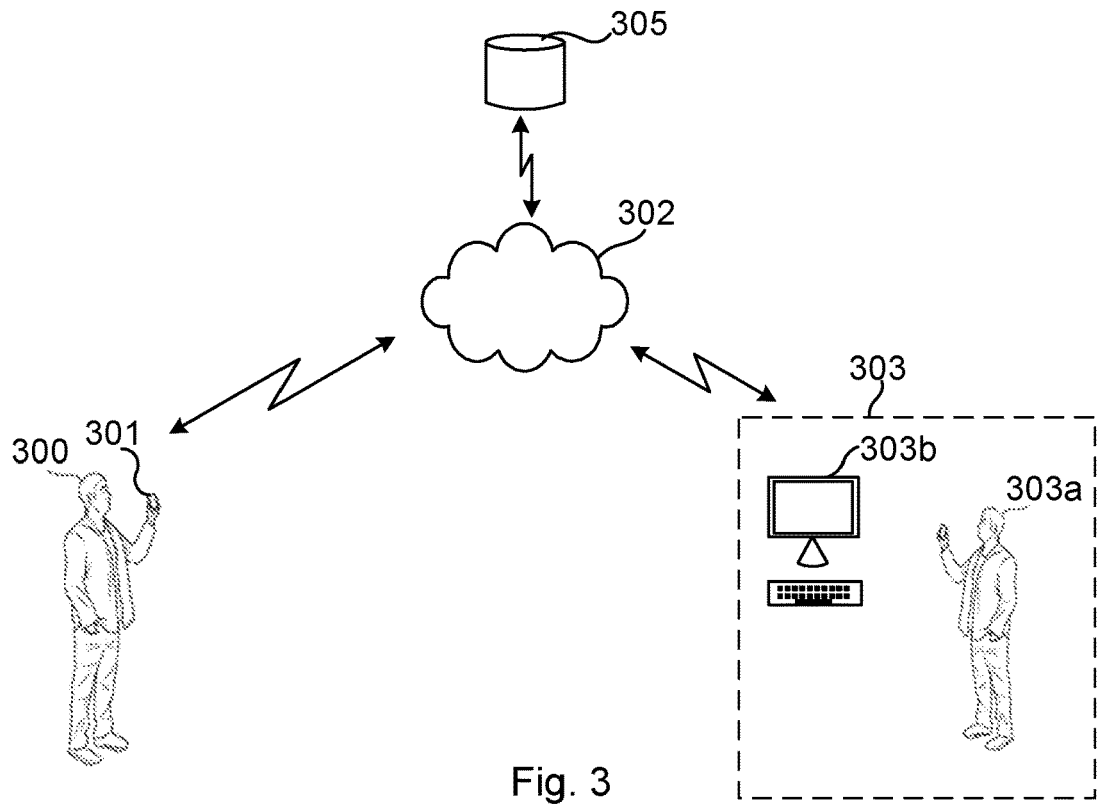
FIG. 3 illustrates a network implementing a digital assistant device according to an embodiment.
Figure 4:
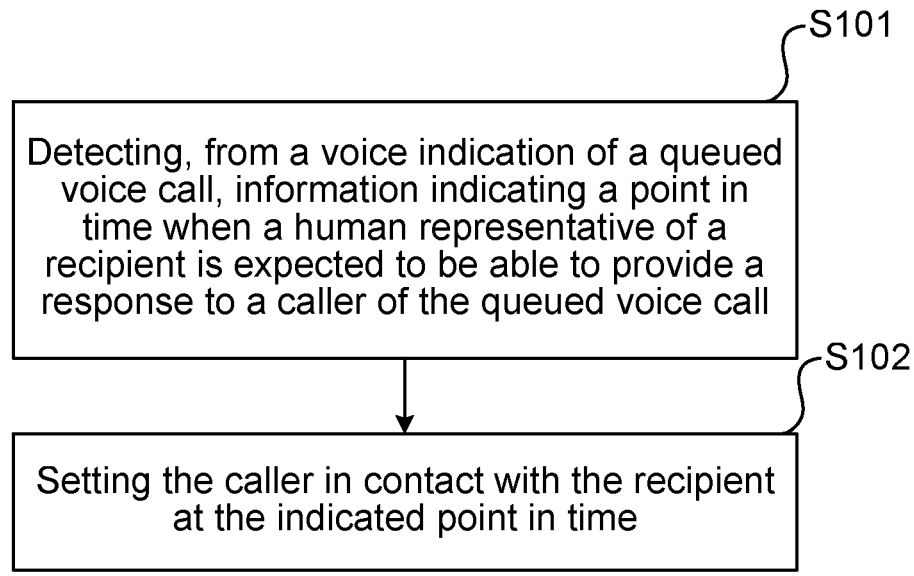
FIG. 4 shows a flowchart illustrating a method of a digital assistant device of managing a queued voice call having been established between a calling party and a recipient according to an embodiment.

An embodiment of a method of a digital assistant device of managing a voice call established between a calling party and a recipient, the voice call having been queued to await a response by a human representative of the recipient of the voice call, will now be described with reference to the network of FIG. 3, in which the embodiment may be implemented, and further with reference to FIG. 4 showing a flowchart of the method.

It is noted that embodiments of the invention described herein may be implemented in the prior art digital assistants illustrated with reference to FIGS. 1 and 2. Further, it is noted that the voice call may constitute any type of call over which voice information is sent, such as a regular Public Switched Telephone Network (PSTN) call, conference call, VoLTE call, Voice over Internet Protocol (VoIP) call, video call, etc.

In this exemplifying embodiment, a calling party—i.e. the user 300—will use a communications devices such as for instance her mobile phone 301 to call a recipient 303 over a communication network 302. In this particular example, the recipient 303 is represented by an authority, such as a national tax office.

Now, upon the caller 300 placing a voice call with the tax office 303 via her mobile phone 301, the voice call is typically directed to a call centre at the tax office, where call centre staff—i.e. a human representative 303*a*—are ready to answer the voice call. The call may be a regular phone call or a Voice over Internet Protocol (VoIP) call using e.g. Skype established via communications network 302.

Upon the voice call being connected to the call centre at the tax office 303, a computer 303*b* implementing a telephone exchange will activate an answering machine which replies to the caller 300 via the mobile phone 301 that the caller 300 has been placed in a call queue.

Nowadays, many companies/authorities provide customer service via voice calls and commonly a customer/user is placed in a queue and informed about his/her place in the queue and how long the expected wait will be until the call is switched from the answering machine to a human representative picking up the call. In the meantime, the customer can only listen to the music or audio recording provided by the call centre and wait in the queue until the representative picks up the call.

Typically, the reply from the answering machine 303b will indicate the caller's position in the queue ("your place in the queue is no. 23") and additionally or alternatively also time remaining until the human representative 303a of the tax office 303 is expected to respond to the queued call ("we will answer your call within approximately 14 minutes").

A number of variants are possible when presenting the position, such as a) position: the caller hears, "your position in queue is [six]", b) ordinal position: the caller hears, "you are the [sixth] caller in the queue", or c) ahead: the caller hears, "there are [five] callers ahead of you", etc.

Now as previously has been discussed, to wait by the phone to listen to the answering machine repeatedly informing about a current place in the queue is a tedious process.

To overcome this problem, a digital assistant device 305 ("Ester") is implemented in the communications network 302 to detect in step S101, from a voice indication of the voice call, information indicating a point in time when the human representative 303a of the tax office 303 is expected to be able to provide a response to the queued voice call. Subsequently in step S102, the digital assistant device 305 will set the caller 300—having hung up the voice call—in contact with the human representative 303a at the indicated point in time.

It is envisaged that the caller 300 is set in contact with the human representative 303a either via the ongoing voice call, in which scenario the caller 300 is notified by the digital assistant device 305 via for instance Short Message Service (SMS), WhatsApp, e-mail, etc., at the indicated point in time that she is expected to pick up the call such that the human representative at the other end of the line can provide the response, or that a new call is established between the caller 300 and the human representative 303a (i.e. the digital assistant device 305 establishes a new call between the tax office 303 and the caller 300).

Figure 5:
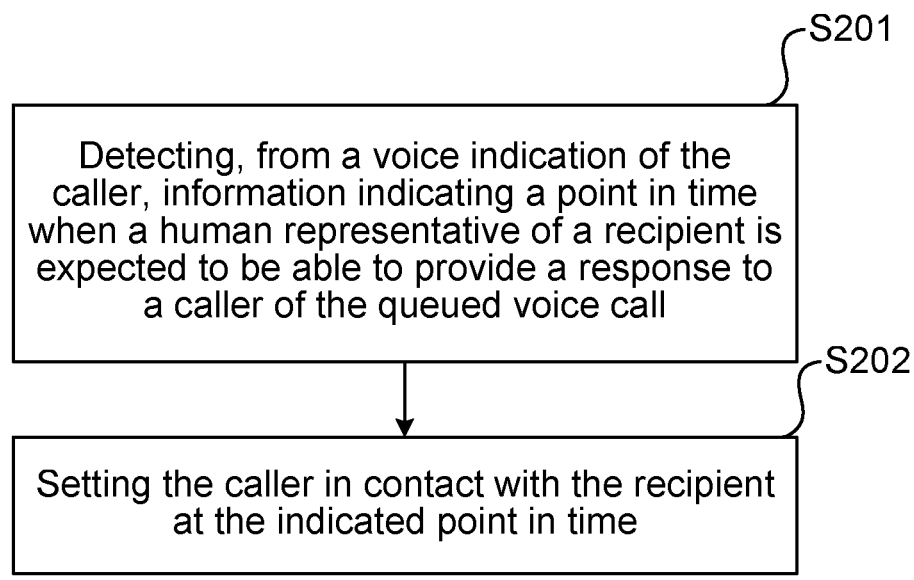
FIG. 5 shows a flowchart illustrating a method of a digital assistant device of managing a queued voice call having been established between a calling party and a recipient according to another embodiment.

In a first embodiment, as will be described with reference to the flowchart of FIG. 5, an instruction from the caller 300 is given to the digital assistant device 305 via the network 302, such as "Ester, please call back when I am no. 2 in the queue", whereupon the caller 300 hangs up the call and under control of the digital assistant device 305 is called back when the caller 300 indeed is no. 2 in the queue, or is notified as described above that that she is expected to resume the ongoing voice call.

Figure 6:
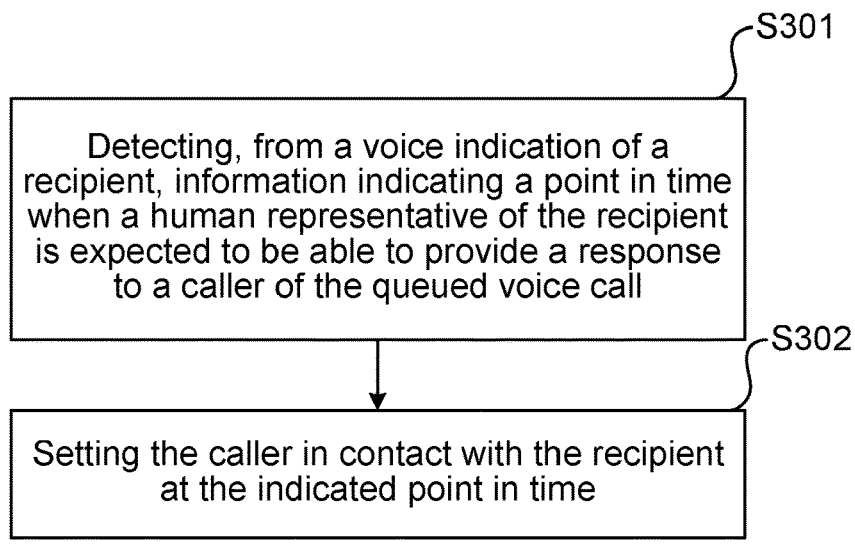
FIG. 6 shows a flowchart illustrating a method of a digital assistant device of managing a queued voice call having been established between a calling party and a recipient according to a further embodiment.

In a second embodiment, as will be described with reference to the flowchart of FIG. 6, the digital assistant device 305 detects from the information given by the answering machine 303b ("we will answer your call within approximately 14 minutes") when the human representative 303a is capable of providing a response, whereupon the digital assistant device 305 establishes a new call, or resumes the ongoing call, between the tax office 303 and the caller 300 such that the caller 300 can talk to the human representative 303a.

In both the first and second embodiment, the digital assistant device 305 will remain in connection with the tax office 303 in order to monitor the queue development to be able to determine from the voice indication of the answering machine 303b when the point in time for the human representative 303a is approaching.

In the first embodiment, the digital assistant device 305 will detect in step S201, from the instruction given by the caller 300 ("Ester, please call back when I am no. 2 in the queue") over the voice call, the point in time when the human representative 303a is expected to be able to provide a response to the queued voice call.

The caller 300 will end the current call, possibly after having been informed by the digital assistant device 305 that the call may be hung up, and in step S202 the digital assistant device 305 will set the caller 300 in contact with the tax office 303 over the network 302 when the caller is no. 2 in the queue, i.e. just before the human representative 303a is available to provide a response.

In an alternative, the instruction given by the caller 300 is "Ester, please call back when it is 1 minute remaining of the queue"). This point in time is thus detected by the digital assistant device 305, which subsequently will set the caller 300 in contact with the tax office 303 when there is one minute remaining of the queue, i.e. again just before the human representative 303a is available to provide a response.

As discussed, since the digital assistant device 305 remains connected with the tax office 303 (even though the caller 300 ends the call), the digital assistant device 305 can establish a new call re-connecting the caller 300 with the tax office 303 just in time for the human representative 303a to respond to the caller 300, or resume the ongoing call. That is, since the digital assistant device 305 remains connected with the tax office 303, the digital assistant device 305 can continuously monitor a current position of the voice call in the queue as the queue steadily decreases from (typically synthetic) voice information provided by the answering machine 303b of the tax office 303.

Since the digital assistant device 305 is part of the voice call, it also has access to useful information of the call, such as e.g. session id and IMS Charging Identifier (ICID).

The detection of the information from the voice indication over the voice call may be achieved using an appropriate audio recognition application at the digital assistant device 305. Such audio recognition applications are well-known in the art and will not be described herein.

Advantageously, the caller 300 is not required to listen to the audio coming from the smartphone 301 informing the caller 300 about her place in the queue. Rather, the caller can end the call and proceed with whatever she wishes to do while waiting for the digital assistant device 305 to set up the new call or resume the ongoing call.

In the second embodiment, the digital assistant device 305 will detect in step S301, from the queue information provided by the answering machine 303b over the voice call, the callers' place in the queue or expected queue time call ("we will answer your call within approximately 14 minutes"). Again, this may be achieved using an appropriate audio recognition application at the digital assistant device 305.

Thus, the digital assistant device 305 detects information indicating a point in time when the human representative 303a is expected to be able to respond, i.e. in 14 minutes in this exemplifying embodiment.

The caller 300 will end the current call, possibly after having been informed by the digital assistant device 305 that the call may be hung up, and in step S103 the digital assistant device 305 subsequently establishes a new voice call, or resume the ongoing call, between the tax office 303 and the caller 300 over the communications network 302 via which the human representative 303a will provide a response to the caller 300.

Since the digital assistant device 305 remains connected with the tax office 303 (even though the caller 300 ends the call), the digital assistant device 305 can establish the new call re-connecting the caller 300 with the tax office 303 just in time for the human representative 303a to respond to the caller 300, or may resume the ongoing call just in time for the human representative 303a to respond.

Again, the caller 300 is advantageously not required to listen to the audio coming from the smartphone 301 informing the caller 300 about her place in the queue. Rather, the caller can end the call and proceed with whatever she wishes to do while waiting for the digital assistant device 305 to set up the new call.

In a further embodiment, after the caller 300 have hung up the call, the digital assistant device 305 will repeatedly notify the caller 300 of a current position of the voice call in the queue. This may be performed via SMS, WhatsApp, e-mail, etc.

Figure 7:
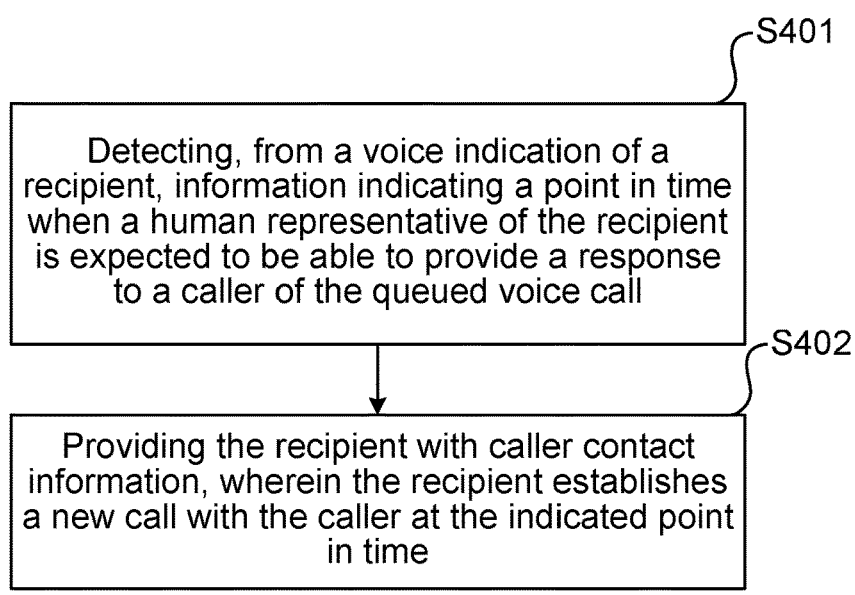
FIG. 7 shows a flowchart illustrating a method of a digital assistant device of managing a queued voice call having been established between a calling party and a recipient according to an embodiment.

FIG. 7 shows a flowchart illustrating a method according to a further embodiment. In a first step S401, the digital assistant device 305 detects, from the queue information provided by the answering machine 303b over the voice call, the callers' place in the queue or expected queue time call ("we will answer your call within approximately 14 minutes").

However, in this embodiment, instead of remaining connected to the tax office 303, the digital assistant device 305 may leave a message to the tax office 303 on behalf of the caller 300 comprising contact information of the caller 300. Since an operator hosting the digital assistant device 305 usually holds information about the caller 300, the message could for instance be "This call is made on behalf of Alice Ericsson, national Id is 123-345. Please call her back on number 999-999". The tax office 303 will thus subsequently establish a voice call with the caller 300 when the human representative 303a is available for providing a response.

Figure 8:
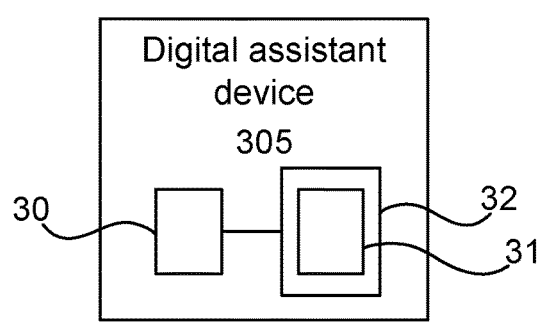
FIG. 8 illustrates a digital assistant device according to an embodiment.

FIG. 8 illustrates a digital assistant 305 according to an embodiment. The steps of the method performed by the digital assistant 305 of managing a voice call established between a calling party and a recipient, the voice call having been queued to await a response by a human representative of the recipient of the voice call, are in practice performed by a processing unit 30 embodied in the form of one or more microprocessors arranged to execute a computer program 31 downloaded to a suitable storage volatile medium 32 associated with the microprocessor, such as a Random Access Memory (RAM), or a non-volatile storage medium such as a Flash memory or a hard disk drive. The processing unit 30 is arranged to cause the digital assistant 305 to carry out the method according to embodiments when the appropriate computer program 31 comprising computer-executable instructions is downloaded to the storage medium 32 and executed by the processing unit 30. The storage medium 32 may also be a computer program product comprising the computer program 31. Alternatively, the computer program 31 may be transferred to the storage medium 32 by means of a suitable computer program product, such as a Digital Versatile Disc (DVD) or a memory stick. As a further alternative, the computer program 31 may be downloaded to the storage medium 32 over a network. The processing unit 30 may alternatively be embodied in the form of a digital signal processor (DSP), an application specific integrated circuit (ASIC), a field-programmable gate array (FPGA), a complex programmable logic device (CPLD), etc.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a digital assistant device of managing a voice call established between a calling party and a recipient, the voice call having been queued to await a response by a human representative of the recipient of the voice call, comprising:
   detecting, from a voice indication provided by the calling party of the voice call, information indicating a point in time when the human representative of the recipient is expected to be able to provide a response to the queued voice call; and
   setting the calling party in contact with the recipient at the determined point in time.

2. The method of claim 1, wherein the digital assistant device is configured to remain connected with the recipient after having detected the information indicating a point in time when the human representative of the recipient is expected to be able to provide a response to the queued voice call, the method further comprising:
   monitoring a current position of the voice call in the queue on the basis of information provided by the recipient.

3. The method of claim 2, wherein the setting of the calling party in contact with the recipient at the determined point in time comprises:
   establishing a new voice call between the recipient and the calling party at the determined point in time, or
   resuming an ongoing voice call between the recipient and the calling party at the determined point in time.

4. The method of claim 3, further comprising:
   notifying the calling party that the ongoing voice call is to be resumed.

5. The method of claim 1, wherein the setting of the calling party in contact with the recipient at the determined point in time comprises:
   providing the recipient with contact information of the calling party, wherein the recipient establishes a voice call with the calling party at the point in time when the human representative of the recipient is expected to be able to provide a response to the queued voice call.

6. The method of claim 1, wherein the detection of information from a voice indication comprises recognizing a non-human voice indication.

7. A non-transitory computer readable storage medium storing a computer program comprising computer-executable instructions for causing a device to perform the method of claim 1.

8. A digital assistant device configured to manage a voice call established between a calling party and a recipient, the voice call having been queued to await a response by a human representative of the recipient of the voice call, the digital assistant device comprising a processing unit and a memory, said memory containing instructions executable by said processing unit, whereby the digital assistant device is operative to: detect, from a voice indication provided by the calling party of the voice call, information indicating a point in time when the human representative of the recipient is expected to be able to provide a response to the queued voice call; and set the calling party in contact with the recipient at the determined point in time.

9. The digital assistant device of claim 8, further being configured to remain connected with the recipient after having detected the information indicating a point in time when the human representative of the recipient is expected to be able to provide a response to the queued voice call, the digital assistant device further being operative to:

monitor a current position of the voice call in the queue on the basis of information provided by the recipient.

10. The digital assistant device of claim 9, further being operative to, when setting the calling party in contact with the recipient at the determined point in time:

establish a new voice call between the recipient and the calling party at the determined point in time, or resume an ongoing voice call between the recipient and the calling party at the determined point in time.

11. The digital assistant device of claim 10, further being operative to:

notify the calling party that the ongoing voice call is to be resumed.

12. The digital assistant device of claim 9, further being operative to:

repeatedly inform the calling party of the current position of the voice call in the queue.

13. The digital assistant device of claim 8, further being operative to, when setting the calling party in contact with the recipient at the determined point in time:

provide the recipient with contact information of the calling party, wherein the recipient establishes a voice call with the calling party at the point in time when the human representative of the recipient is expected to be able to provide a response to the queued voice call.

14. The digital assistant device of claim 8, further being operative to detect information from a voice indication by recognizing a non-human voice indication.

* * * * *